US012645556B1

(12) United States Patent
Karis et al.

(10) Patent No.: US 12,645,556 B1
(45) Date of Patent: Jun. 2, 2026

(54) AGGREGATION AND ROUTING OF METRIC TIME SERIES DATA

(71) Applicant: Cisco Technology, Inc., San Jose, CA (US)

(72) Inventors: Steven Karis, Pacifica, CA (US); Rachel Kolavo, Boulder, CO (US); Nathan Moeller, San Jose, CA (US); Kevin Cheng, Seattle, WA (US); Ramakrishnan Hariharan Chandrasekharapuram, San Jose, CA (US); Archanan Padmasenan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/094,798

(22) Filed: Jan. 9, 2023

(51) Int. Cl.
        *G06F 11/30*          (2006.01)
(52) U.S. Cl.
        CPC ...... *G06F 11/3075* (2013.01); *G06F 11/3082* (2013.01)
(58) Field of Classification Search
        None
        See application file for complete search history.

(56) References Cited

U.S. PATENT DOCUMENTS

| | | | |
|---|---|---|---|
| 5,063,521 A | 11/1991 | Peterson et al. | |
| 6,941,287 B1 | 9/2005 | Vaidyanathan et al. | |
| 7,937,344 B2 * | 5/2011 | Baum | G06F 16/24564 |
| | | | 706/20 |
| 8,112,425 B2 | 2/2012 | Baum et al. | |
| 8,751,529 B2 * | 6/2014 | Zhang | G06F 16/2471 |
| | | | 707/795 |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 10,558,543 B2 * | 2/2020 | Harutyunyan | G06F 11/3452 |
| 10,931,743 B1 * | 2/2021 | Chou | H04L 41/12 |
| 11,200,130 B2 * | 12/2021 | Tankersley | G06Q 10/06393 |
| 12,190,086 B1 | 1/2025 | Hanebutte et al. | |
| 12,265,459 B1 | 4/2025 | Ross et al. | |

(Continued)

OTHER PUBLICATIONS

Splunk Enterprise 8.0.0 Overview, available online, retrieved May 20, 2020 from docs.splunk.com.

(Continued)

*Primary Examiner* — Scott B Christensen

(74) *Attorney, Agent, or Firm* — Kilpatrick Townsend & Stockton LLP

(57)                ABSTRACT

Described herein are techniques for aggregating metric time series data upon ingestion, such as prior to intake, analysis, or processing by a data quantizer system. The disclosed techniques can transforming metric time series data into aggregated metric time series data, optionally with reduced complexity or dimensionality, while retaining various statistical information characteristic of the original source metric time series data. The aggregated metric time series data can be used in the same way as the original source metric time series data or other metric time series data, such as for processing or generating streaming analytics data or triggering events or notifications by a data quantizer system.

19 Claims, 6 Drawing Sheets

(56) References Cited

U.S. PATENT DOCUMENTS

| | | | |
|---|---|---|---|
| 2012/0078975 A1 | 3/2012 | Chen et al. | |
| 2016/0140208 A1 | 5/2016 | Dang et al. | |
| 2017/0047973 A1 | 2/2017 | Wu et al. | |
| 2018/0046567 A1 | 2/2018 | Liu et al. | |
| 2019/0098106 A1* | 3/2019 | Mungel | H04L 67/564 |
| 2020/0089590 A1* | 3/2020 | Togawa | G06F 11/0709 |
| 2021/0075456 A1 | 3/2021 | Orhan et al. | |
| 2021/0243092 A1* | 8/2021 | Labonte | G06F 16/219 |
| 2021/0350304 A1* | 11/2021 | Bhowmik | G06Q 10/06393 |
| 2023/0418467 A1 | 12/2023 | Ezrielev et al. | |
| 2024/0412620 A1 | 12/2024 | Andrzejewski et al. | |
| 2025/0159045 A1 | 5/2025 | Sterbling et al. | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

U.S. Appl. No. 18/094,801, "Final Office Action", May 8, 2025, 20 pages.

\* cited by examiner

Figure 1:
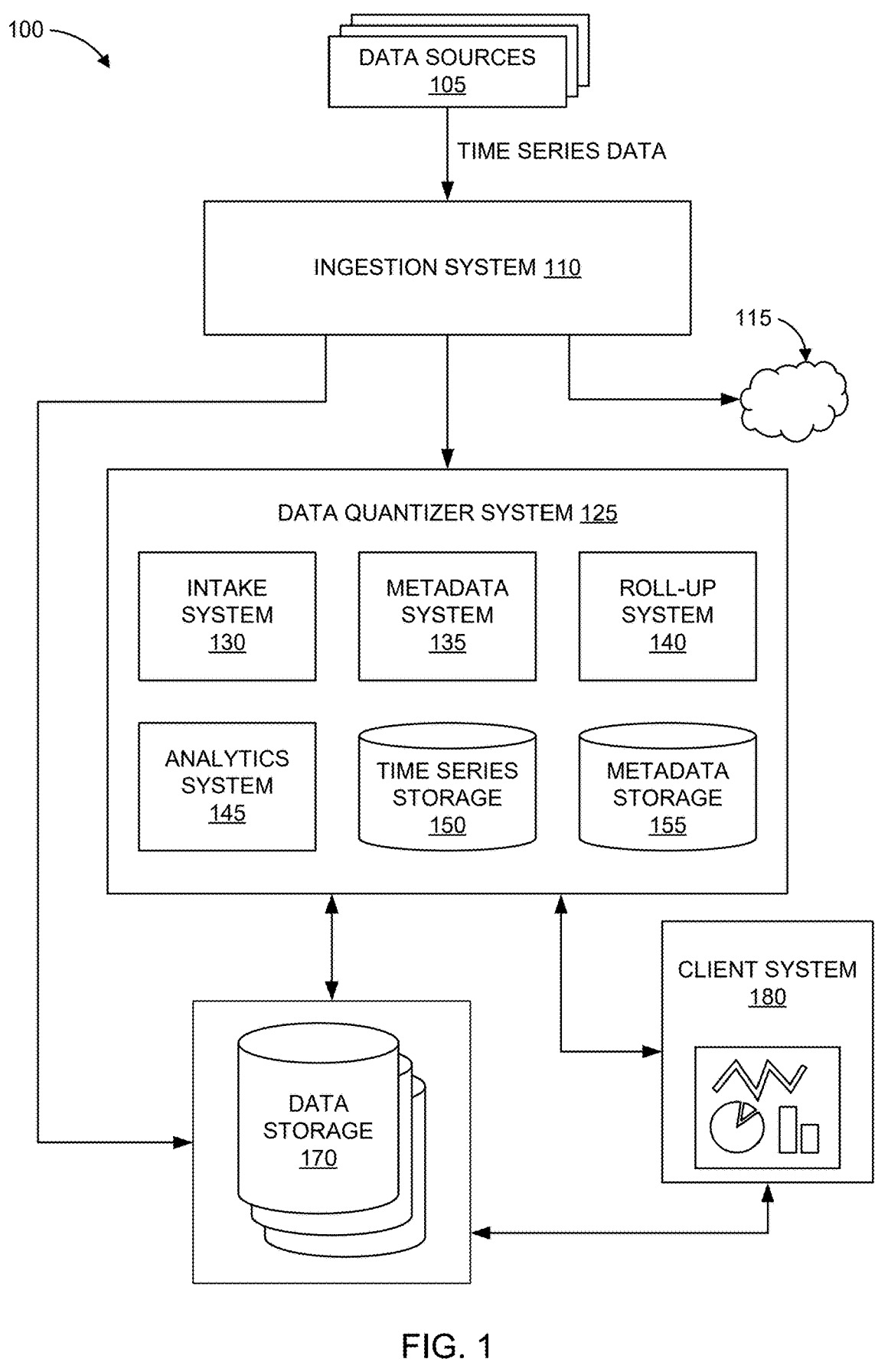

100

DATA SOURCES
105

TIME SERIES DATA

INGESTION SYSTEM 110

115

DATA QUANTIZER SYSTEM 125

INTAKE
SYSTEM
130

METADATA
SYSTEM
135

ROLL-UP
SYSTEM
140

ANALYTICS
SYSTEM
145

TIME SERIES
STORAGE
150

METADATA
STORAGE
155

DATA
STORAGE
170

CLIENT SYSTEM
180

| FIRST DIMENSION 304 | SECOND DIMENSION 306 | METRIC VALUE 308 |
|:---:|:---:|:---:|
| 1 | A | 10 |
| 1 | B | 5 |
| 2 | C | 15 |
| 1 | D | 40 |
| 1 | A | 5 |
| 2 | B | 0 |
| 1 | C | 0 |
| 1 | D | 10 |
| 3 | A | 20 |
| 3 | B | 15 |
| 3 | C | 70 |

| FIRST DIMENSION 354 | METRIC VALUES (COUNT, SUM, MIN, MAX) 358 |
|:---:|:---:|
| 1 | 6, 70, 0, 40 |
| 2 | 2, 15, 0, 15 |
| 3 | 3, 105, 15, 70 |

| TIME 402 | FIRST DIMENSION 404 | SECOND DIMENSION 406 | METRIC VALUE 408 |
|---|---|---|---|
| 1 | 1 | A | 10 |
|  | 1 | B | 20 |
|  | 2 | C | 40 |
| 2 | 1 | A | 20 |
|  | 1 | B | 10 |
|  | 2 | C | 10 |
| 3 | 1 | A | 30 |
|  | 1 | B | 20 |
|  | 2 | C | 20 |

| TIME 452 | FIRST DIMENSION 454 | METRIC VALUES (COUNT, SUM, MIN, MAX, DELTA) 458 |
|---|---|---|
| 1 | 1 | 2, 30, 10, 20, 30 |
|  | 2 | 1, 40, 40, 40, 40 |
| 2 | 1 | 2, 30, 10, 20, 20 |
|  | 2 | 1, 10, 10, 10, 10 |
| 3 | 1 | 2, 50, 20, 30, 20 |
|  | 2 | 1, 20, 20, 20, 10 |

FIG. 4B

AGGREGATION AND ROUTING OF METRIC TIME SERIES DATA

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or based on hardware parameters associated with a computing system on which the software is operating (e.g., processor usage). For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics, such as processor usage or memory usage, in real-time to allow for identification of problems as they occur. Tracking machine data in real-time or over various time periods (e.g., hours, days, weeks, months) can also allow for identification of patterns and can be useful for scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

BRIEF DESCRIPTION OF THE DRAWINGS

Illustrative examples are described in detail below with reference to the following figures:

FIG. 1 provides a block diagram of an embodiment of an environment for collecting, analyzing, processing, and storing time series data.

FIG. 3A provides an example metric time series including two dimensions and a metric value. FIG. 3B provides an example aggregated metric time series generated from the metric time series depicted in FIG. 3A.

FIG. 4A provides an example metric time series including two dimensions and a cumulative metric value at a plurality of different times. FIG. 4B provides an example aggregated metric time series generated from the metric time series depicted in FIG. 4A.

DETAILED DESCRIPTION

Figure 2:
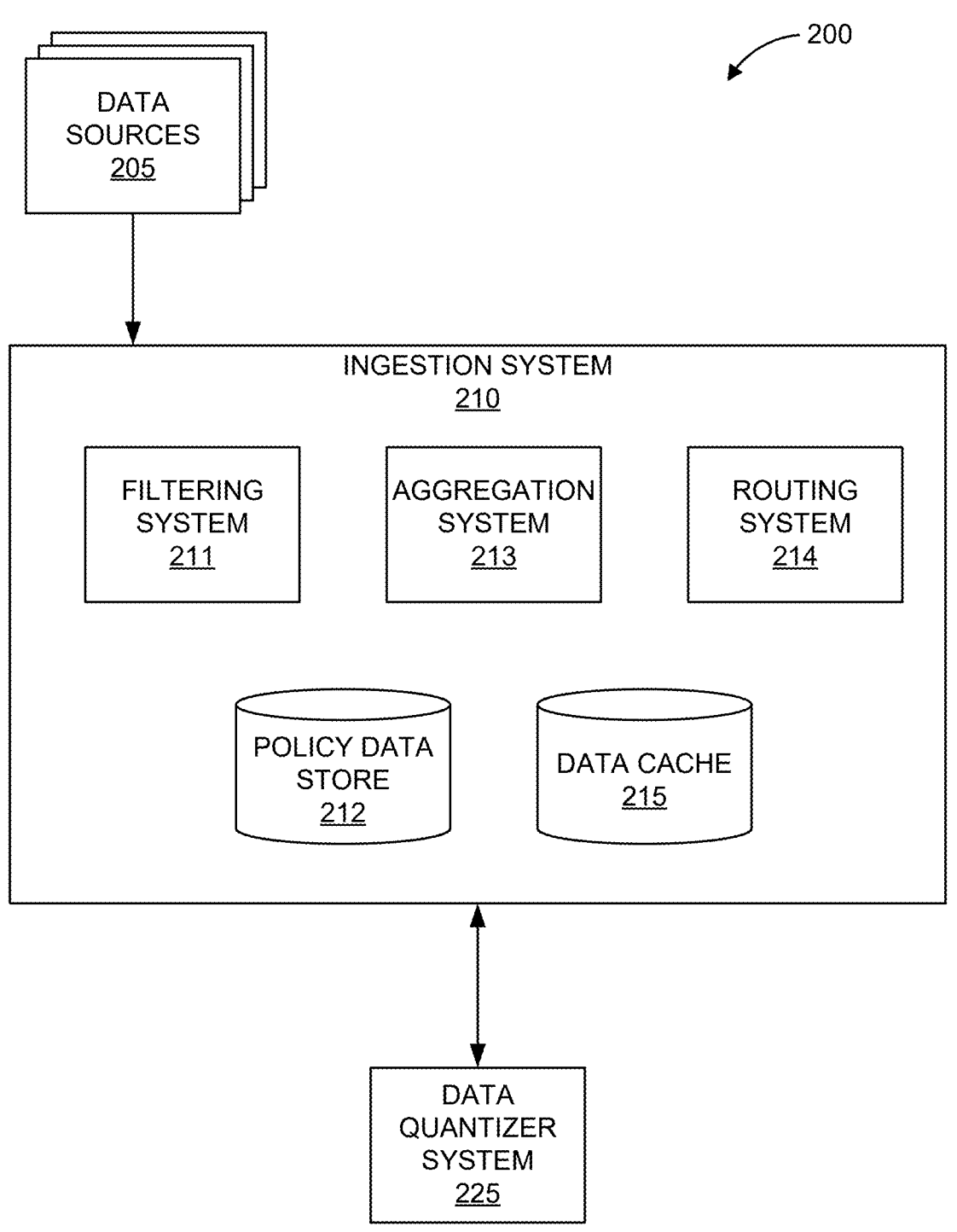
FIG. 2 provides a block diagram of an example ingestion system for aggregating metric time series as part of an environment for collecting analyzing, processing, and storing time series data.

Techniques, which may be embodied herein as systems, computing devices, methods, algorithms, software, code, computer readable media, or the like, are described herein for aggregating metric time series data upon ingestion, such as prior to intake, analysis, or processing by a data quantizer system. The disclosed techniques can reduce overhead, such as in the form of processor usage, network usage, data storage, or the like, by transforming metric time series data into aggregated metric time series data, optionally with reduced complexity or dimensionality, while retaining various statistical information characteristic of the original source metric time series data. The aggregated metric time series data can be used in the same way as the original source metric time series data or other metric time series data, such as for processing or generating streaming analytics data or triggering events or notifications by a data quantizer system, and can be used to provide analytics data with a faster response time to a request than may be possible using the original source metric time series data, in some cases.

It will be appreciated that the above-described aspects may be implemented as methods, systems, computing devices, and/or non-transitory computer readable media. For example, a system or computing device may comprise one or more processors and a non-transitory computer-readable storage medium having stored thereon instructions that, when executed by the one or more processors, may cause the one or more processors to perform operations, such as operations corresponding to methods described herein. In another example, a non-transitory computer-readable storage medium may comprise or have stored thereon instructions that, when executed by the one or more processors, may cause the one or more processors to perform operations, such as operations corresponding to methods described herein.

The term embodiment and like terms are intended to refer broadly to all of the subject matter of this disclosure and the claims below. Statements containing these terms should be understood not to limit the subject matter described herein or to limit the meaning or scope of the claims below.

Embodiments described herein are useful for analyzing, visualizing, organizing, or otherwise using machine data, such as for purposes of determining the state or condition of a system, such as to trigger an event based on the state or condition of the system or other conditions. For example, machine data can be raw machine data that is generated by various components in IT environments, such as servers, sensors, routers, mobile devices, Internet of Things (IoT) devices, etc. Machine data can include log data, network packet data, sensor data, application program data, error log data, stack trace data, performance data, metrics, tracing data, diagnostic data, and many other types of data.

The machine data may be organized as time series data, where each data point may have or be associated with one or more times or timestamps, such as a raw time, a receipt time, a publication time, etc., one or more values or metrics, such as a numerical measurement that can change over time (e.g., processor usage, network latency, total transactions or transactions per unit time, etc.), and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, a set of time series data associated with the same metric name and/or including the same or particular values for dimensions may be referred to as a metric time series or MTS. Metric time series and other time series data may be used for various applications, such as for identification of patterns or anomalies.

In some examples, it may be desirable to monitor multiple streams of metric time series data from multiple sources and transform the data, such as for purposes of alerting or triggering on the original or transformed data or to visualize the original or transformed data, such as to evaluate anomalies, understand patterns, or alter resource usage, for example. In some examples, it may be desirable to aggregate a stream of metric time series data into an aggregated form with reduced dimensionality or complexity prior to performing additional analysis, transformation, or quantization of the data. In some cases, limits on numbers of data points from metric time series that can be retrieved, stored, and/or analyzed, such as in a certain amount of time, can be overcome by reducing the number, complexity, and/or dimensionality of the data points by aggregating multiple data points into fewer data points and/or by aggregating multiple data points into data points with reduced dimensionality, complexity, and/or number.

Advantageously, the techniques described herein for aggregating metric time series data upon ingestion or receipt can be performed for all or only a subset of all received metric time series data. In one example, the subset of metric time series data may be filtered or identified, such as according to or using one or more filter criteria, while other metric time series data are allowed to be processed without such initial aggregation upon ingestion. In another example, the subset of metric time series data may be allowed to be processed without initial aggregation upon ingestion not be filtered or identified, while other metric time series data can be filtered or identified, such as according to or using one or more filter criteria. In some cases, certain metric time series data may be flagged to indicate that the full-fidelity (e.g., original unmodified) metric time series data is not needed or does not need to be stored in the same way as other metric time series data. Such flagging may be performed for a variety of reasons, including, but not limited to, perceived or actual utility of the original metric time series data or a portion thereof, data storage limits, data processing considerations, or other reasons, including costs, operational decisions, or other non-technical considerations. Various filter criteria may be created or identified and used to flag, trigger, or identify particular time series for aggregation upon ingestion according to the disclosed techniques and/or to flag, trigger, or identify particular time series for directly forwarding to a data quantizer system.

Data aggregation according to the disclosed techniques can occur in a variety of different ways, which can be different than other aggregation techniques used previously. For example, instead of performing roll-up aggregation, where data values in the received data points are transformed to roll-up data points including quantized values associated with one or more regular time intervals, the aggregation upon ingestion according to the disclosed techniques may combine multiple data points to include a summary or statistical information about the combined data values in a newly created aggregated data point. For example, the aggregated data can include one or more of a count of number of data points represented by the aggregated data, a sum of values from data points represented by the aggregated data, a maximum of from values data points represented by the aggregated data, a minimum of values from data points represented by the aggregated data, an average of values from data points represented by the aggregated data, a sum of changes in values from data points represented by the aggregated data, a standard deviation of values from data points represented by the aggregated data.

In some cases, a complexity (e.g., cardinality) of the original metric time series data can be reduced upon aggregation. For example, metric time series data may include or track multiple dimensions and multiple values and the aggregation process can simplify the metric time series data such that one or more dimensions and one or more values are not incorporated into the aggregated data. In these ways, the size and/or complexity of metric time series data can be reduced upon ingestion, which can allow for storage, processing, or other limits or constraints to be avoided or bypassed while still retaining useful data content information from the original time series. In some examples, a number of dimensions may be reduced upon aggregation, such that the aggregated metric time series data comprises one or more dimensions fewer than present in the source metric time series data.

The resulting aggregated metric time series data can be subjected to conventional aggregation, transformation, or other processes in the same way or similar to the way non-aggregated or non-filtered metric time series data is processed. For example, the aggregated metric time series data can be subjected to processing to generate roll-up data points including quantized values associated with one or more regular time intervals. Using the aggregated metric time series data instead of the original metric time series data can result in performance improvements due to fewer numbers of data points having to be processed by the subsequent aggregation, transformation, or other processes as compared to evaluation of the original metric time series data.

1.0. Data Stream Quantization

FIG. 1 shows an overview of an example environment 100 for collecting, analyzing, processing, and storing time series data (e.g., metric time series data). Metric time series data may be generated in real time by various data sources 105, which may be distributed across various networks. These data sources 105 may transmit the metric time series data to an ingestion system 110, such as over a network, which may include a private network, a wide area network, or a public network (e.g., the Internet). In some cases, the ingestion system 110 may be at a location remote from the data sources 105, though in some cases the ingestion system 110 and one or more data sources 105 may be at a common location, and optionally on the same local network. The metric time series data may include data points that are generated on a repeated basis, which may be a periodic basis (e.g., every second, every minute, etc.) or on a non-periodic basis (e.g., when a generation threshold is reached, upon system reboot, etc.).

The data ingestion system 110 can process the metric time series data, such as to generate aggregated data, as described in further detail herein. The data ingestion system 110 can also or alternatively forward metric time series data, including aggregated metric time series data, to various systems or components. In FIG. 1, data ingestion system 110 is shown directing metric time series data or aggregated metric time series data to a data quantizer system 125, a data storage 160, or a remote system 115. In some cases, certain metric time series data, or portions thereof, may be identified to be not forwarded to another system, which may be referred to herein as dropping the non-forwarded metric time series data. Data ingestion system 110 can include various subsystems or components, as described herein. Although illustrated in FIG. 1 as distinct systems, some embodiments incorporate data ingestion system 110 and data quantizer system 125 as parts of a common system, such as where data ingestion system 110 is a component of data quantizer system 125.

As illustrated, the data quantizer system 125 may include various subsystems or components, such as an intake system 130, a metadata system 120, a time series storage 150, a metadata storage 155, an analytics system 145, or the like. These and other components of the data quantizer system 125 may be present as or in a single computing system or may be separate and individually distributed components among a distributed computing system, including where the different components may be physically present in separate locations.

The data sources 105 may be or comprise any suitable computing devices, sensors, software systems, etc., that can generate or collect machine data or other data and transmit the machine data or other data in the form of metric time series data to the ingestion system 110, such as over one or more network connections. The data sources 105 can include hosted or containerized software or services operating on cloud infrastructure, where computing resources are shared between multiple hosted software or services. The data sources 105 can be present in a single location or data center or distributed among various data centers, which may be located remotely from one another.

The metric time series data generated by the data sources 105 may include one or more data points. Each data point can include or be associated with a raw time that can correspond to a timestamp indicating when a data point is generated by a data source 105, a time at which a data point is transmitted by a data source 105, and/or some other time assigned to the data point by the data source 105. Each data point can also include or be associated with one or more metadata categories, metadata values, dimension categories, and/or more dimension values. Each data point can also include or be associated with one or more numeric values, also referred to herein as metric values, which can optionally correspond to or represent a quantification of some machine data, sensor data, performance data, etc.

The data quantizer system 125 may intake the metric time series data and/or aggregated metric time series data using the intake system 130. The intake system 130 can receive the metric time series data and/or aggregated metric time series data from the ingestion system 110, and optionally assign a receipt time to the data points based on a time at which the data points are received, which is generally different from a raw time associated with the data points, since there is usually some latency associated with transmitting the data point to the data quantizer system 125 over a network and/or processing by ingestion system 110. In some cases, however, a raw time and a receipt time may be the same, such as if network latency is low, ingestion processing time is short, and/or if the precision of the raw time and/or receipt time is larger than the network latency and any processing time (e.g., when the raw time and the receipt time have a precision of 1 second and network latency and processing time is less than 100 ms). The intake system 130 may remove extraneous information from the metric time series data, as desired, and may adjust or format the metric time series data to a standard format used by the data quantizer system 125, if not already so formatted.

The metadata system 135 may optionally create or assign metadata (e.g., identifiers, dimensions, tags, labels, or the like), to the data points, such as if such metadata is not already assigned or present in the data points or if the metadata system 135 is otherwise assigned to or has rules indicating such metadata is to be assigned. The metadata system 135 may retrieve from or store metadata information to metadata storage 155. Optionally, metadata storage 155 may store an index or rules for associating various metadata with various metric time series data or components thereof.

A roll-up system 140 may process received data points so as to transform the data values in the received data points to roll-up data points including quantized values associated with one or more regular time intervals. The regular time intervals may be as small as time intervals associated with the received data points but may also be larger, such that multiple values for multiple data points can be combined to generate a quantized value. For example, the received data points may be associated with a time interval of 0.1 seconds, such that 10 data points are received by data quantizer system 125 each second; the roll-up data points may be generated for every 1 second, every 5 seconds, every 15 seconds, every minute, etc., on an ongoing basis. Assuming all data points are received and included in the combination for generating roll-up data points, each 1 second roll-up data point may have a quantized value generated from values for 10 data points. Similarly, each 5 second roll-up data point may have a quantized value generated from values for 50 data points, each 15 second roll-up data point may have a quantized value generated from values for 150 data points, and each minute roll-up data point may have a quantized value generated from values for 600 data points. When combining values from multiple data points to generate a quantized value for a roll-up data point, any desirable technique may be used. In some cases, the quantized value may correspond to a sum of the data values. In some cases, the quantized value may correspond to a statistical measure of the data values, such as an average or standard deviation. In some cases, a formula or algorithm may be used for computing quantized values from a plurality of data values.

Without limitation, metric time series data may be stored to time series storage 150, such as by intake system 130 or by another system, such as a roll-up system 140, which may store the metric time series data in the form of roll-up data to time series storage 150.

In some cases, it may be desirable to transform, combine, or associate different time series with one another, such as for various analytics purposes. Analytics system 145 may be used to generate, aggregate, transform, or otherwise combine data from one or multiple different time series to generate analytics data (e.g., a time series of transformed, aggregated, or combined metric time series data that may optionally be grouped over a common attribute, such as a metadata attribute). Optionally, the metric time series data used by the analytics system 145 to generate analytics data may include roll-up data points as generated using a roll-up system, as described above. In some examples, one metric time series may include data points with values for processor usage for a particular processor core and a second metric time series may include data points with values for processor usage for another processor core, and it is desired to determine an overall total or average processor core usage. As another example, multiple metric time series (e.g., including roll-up data at a fixed time interval) may include data points for processor usage for various processors in a particular data center and it may be desired to have a metric time series including an overall total or average processor usage for the data center. The analytics system 145 can identify the metric time series that include metadata identifying the particular data center and determine a sum or average of the processor usage for all the identified metric time series on a per time interval basis to generate analytics data comprising an aggregated metric time series representing the overall total or average processor usage for the data center. In some examples, the analytics system 145 may optionally receive input or an analytics data request identifying a particular transformed, combined, or aggregated metric time series to generate and then generate appropriate analytics data in response.

As metric time series data from data sources 105 and/or aggregated metric time series data is received by data quantizer system 125 on a continuing basis, the intake system 130, metadata system 135, roll-up system 140, and/or analytics system 145 may perform the above-described aspects repeatedly and optionally in real-time as additional data points are received.

One or more client systems 180 can be used to facilitate visualizing and monitoring conditions, metric time series data, including aggregated metric time series data, and optionally including data quantized into roll-up data points by the data quantizer system, and/or other machine data associated with or generated by the various data sources 105, such as in the form of analytics data. In some cases, the data quantizer system 125, or a subsystem or component thereof (e.g., analytics system 145) can enable identification of problems, errors, or undesired performance associated with one or more of the data sources 105 in real-time or near real-time, allowing for troubleshooting and resolution of such issues while minimizing downtime. For example, the metric time series data may comprise a processing load on each of the data sources 105, such as data sources that correspond to a plurality of servers distributed across a plurality of data centers. The data quantizer system 125 and/or analytics system 145 can enable correlation and visualization of analytics data representing different servers in different data centers, for example, and such processing usage on a per-data center basis can be monitored or explored, for example, by one or more users associated with client systems 180.

The data quantizer system 125 may provide analytics data to software applications executing on client systems 180 that permits users to interact with the analytics data, such as for purposes of selection of data to be included in the analytics data (e.g., based on a metadata filtering query) or to visualize the data, specification or assignment of metadata, identification of alert conditions or triggers, on-demand report generation, selection of automatic report generation based on trigger or threshold conditions, or the like. In some embodiments, the software application can be an internet browser, which may include client-side code (e.g., Java Script) for accessing the data quantizer system 125. In some embodiments, the software application is a proprietary application developed for interacting with the data quantizer system 125.

The data quantizer system 125 and/or the ingestion system 110 can optionally store metric time series data from one or data sources, aggregated metric time series data, rolled-up metric time series data, or other time series data to data storage 170, which may be remote or separate from data quantizer system 125, or it may be included as a component of data quantizer system 125. Client system 180 can optionally retrieve data from data storage 170 or facilitate retrieval of data from data storage 170, such as by data quantizer system 125, such as for purposes of visualizing the retrieved data. 2.0. AGGREGATION OF TIME SERIES DATA Data ingestion systems can include various systems or components to facilitate receiving data from data sources, creation of aggregated data, and forwarding data to appropriate other systems, as described above. FIG. 2 show an overview of an example environment 200, such as for collecting, analyzing, processing, routing, and/or aggregating time series data. Specifically, FIG. 2 shows an ingestion system 210 providing an interface between client data sources 205 and data quantizer system 225. Ingestion system 210 may be the same as or different from ingestion system 110 depicted in FIG. 1. Data sources 205 may be the same as or different from data sources 105 depicted in FIG. 1. Data quantizer system 225 may be the same as or different from data quantizer system 125 depicted in FIG. 1.

Ingestion system 210 comprises a filtering system 211, a policy data store 212, an aggregation system 213, a routing system 214, and a data cache 215. From the perspective of the data sources 205, metric time series data are sent to the data quantizer system 225, with the ingestion system 210 providing aggregation of certain metric time series data. From the perspective of data quantizer system 225, metric time series data are received from ingestion system 210 as an intermediary for data sources 205, such as to collect, filter, route, and or aggregate certain metric time series data In this way, ingestion system 210 acts as an interface with data quantizer system 225 for data sources 205 and so the use of the filtering and aggregation techniques described herein may be transparent to data sources 205 and data quantizer system 225, meaning no programmatic changes may be needed at data sources 205 and/or at data quantizer system 225 for use of the disclosed techniques.

Within ingestion system 210, received metric time series data are subjected to filtering by filtering system 211, which may obtain one or more filter criteria from policy data store 212. In some cases, the filter criteria may identify a particular dimension or metadata value, such that the matching metric time series data including the particular dimension or metadata value may be flagged for aggregation or, alternatively, that the matching metric time series data including the particular dimension or metadata value may be flagged for forwarding to the data quantizer system 225 without aggregation. Optionally, the filter criteria may be predefined, obtained from a remote system, or assigned according to received input (e.g., user input). In some examples, the filtering system 211 can direct metric time series data to data cache 215, such as for temporary or working storage of metric time series data prior to filtering, while filtering, or after filtering. Optionally, the aggregation system 213 can direct metric time series data to data cache 215, such as for temporary or working storage of metric time series data prior to aggregating, while aggregating, or after aggregating. Optionally, the routing system 214 can direct or obtain metric time series data to or from data cache 215.

Metric time series data flagged for aggregation by filtering system 211 can be aggregated by aggregation system 213 according to one or more aggregation criteria. The aggregation system 213 may obtain the one or more aggregation criteria from policy data store 212. Optionally, the aggregation criteria may be predefined, obtained from a remote system, or assigned according to received input (e.g., user input). As examples, the aggregation criteria may specify a number of data points from the metric time series data to consolidate for each aggregated data point, a time interval for receiving data points from the metric time series data to consolidate for each aggregated data point, a computation algorithm for aggregating values for each aggregated data point, one or more dimensions to use for aggregation of the metric time series data, one or more dimensions to drop from the metric time series data, or the like. In some examples, aggregation system 213 can aggregate the metric time series data by using a plurality of values from a plurality of different data points of the metric time series data.

In a specific example, the data points of a metric time series data flagged for aggregation can include a first dimension with one or more first dimension values, a second dimension with one or more second dimension values, and one or more metric values. Optionally, aggregation by the aggregation system can comprise generating an aggregated metric time series data point using multiple data points of the metric time series data, with the aggregated metric time series data point including one or more entries, with each entry corresponding to a different first dimension value, with one or more data values characteristic of data points of the multiple data points having a matching first dimension value. In this or other examples, additional dimensions, such as the second dimension and second dimension values, can be optionally dropped, such has to reduce a dimensionality of the aggregated data as compared to the metric time series data. The one or more data values may include one or more of a count of data values aggregated into the data point, a sum of the data values aggregated into the data point, a maximum of the data values aggregated into the data point, a minimum of the data values aggregated into the data point, an average of the data values aggregated into the data point, or a sum of changes in data values aggregated into the data point as compared to a previous aggregated data point.

The routing system 214 can direct various metric time series data, optionally including aggregated metric time series data, to an appropriate receiver, such as to data quantizer system 225, to a data storage (not shown in FIG. 2), and/or to another remote system (not shown in FIG. 2). In some cases, routing system 214 can identify or determine that particular metric time series data is to be dropped (e.g., not forwarded to data quantizer system 225 or another system), such as after aggregating. Routing system 214 may optionally use one or more routing criteria, such as stored in policy data store 212, to identify or determine where to direct the various time series data. Optionally, the routing criteria may be predefined, obtained from a remote system, or assigned according to received input (e.g., user input).

As an example of predefined routing criteria, metric time series data that is not flagged for aggregation may be identified for automatic routing to data quantizer system 225, while metric time series data that is flagged for aggregation may be dropped or directed only to a storage system and not to data quantizer system 225, with the aggregated metric time series data also directed to data quantizer system 225. In this way, the source metric time series data may be dropped or stored by a storage system, while the aggregated metric time series data and non-filtered metric time series data can be processed by data quantizer system 225, such as for use in analytics, data visualizations, event triggering, or the like. In some cases, the routing criteria can specify where to transmit one or more metric time series or aggregated metric time series to, such as specifying that the one or more metric time series or aggregated metric time series or records thereof are to be published to one or more Kafka topics, which may correspond to time series data inputs of the data quantizer system 225. The process of routing the metric time series or aggregated metric time series may include publishing the data to the one or more Kafka topics. In cases where data is dropped, this may refer to the data being explicitly not published to one or more Kafka topics for use by the data quantizer system 225.

The present embodiments provide for dynamic aggregation or non-aggregation of metric time series data in order to summarize and/or simplify certain metric time series data while allowing other metric time series data to pass unmodified. In this way, the ingestion system 210 can efficiently receive, process, and forward metric time series data, including aggregated metric time series data, to a data quantizer system. In some examples, ingestion system 210 can operate without requiring significant modifications, or in some cases any modifications, on the part of either the data sources 205 or the data quantizer system 225, allowing the ingestion system 210 to receive metric time series data from the data sources 205 as if it were a data quantizer system, and/or allowing the ingestion system 210 to transmit metric time series data, including aggregated metric time series data, to the data quantizer system 225, as if it were a data source. By receiving and aggregating metric time series data, network data transmissions and data storage can be reduced, such as at the data quantizer system 225 or at a data storage system, since the aggregated metric time series data can be reduced in size and/or have a reduced dimensionality as compared to the original source metric time series data. Since the aggregated metric time series data can be smaller in dimensions or number, the aggregated metric time series data can, in some cases, be used to trigger events when the source metric time series data might be unsuitable or undesirable for triggering.

3.0. Examples of Data Aggregation in an Ingestion System

As described above, aggregating metric time series data can be performed to reduce overhead, network usage, storage usage, and create new aggregated time series data that can optionally be used for purposes for which the source metric time series data could be unsuitable. FIG. 3A and FIG. 3B provides an example showing aggregation of metric time series data. FIG. 3A depicts metric time series 300 including a first dimension 304, a second dimension 306, and a metric value 308. A plurality of different first dimension values for first dimension 304 are shown. In this example, first dimension 304 has a value of 1, 2, or 3. A plurality of different second dimension values for second dimension 306 are shown. In this example, second dimension 306 has a value of A, B, C, or D. A variety of different values for metric value 308 are shown. It will be appreciated that these values are merely examples and that any other number of values and entries and specific values for various dimensions in a metric time series can be used, such as to represent a particular set of information from a data source.

FIG. 3B depicts an example aggregated metric time series 350 including a first dimension 354. Aggregated metric time series 350 can be generated from metric time series 300, such as by an ingestion system (e.g., ingestion system 110 or ingestion system 210). For generation of aggregated metric time series 350, the data from metric time series 300 are aggregated according to the first dimension 304, with second dimension 306 dropped. Here, aggregated metric time series 350 shows entries in first dimension 354 for each value of first dimension 304—a first entry with a first dimension value for first dimension 354 of 1, a second entry with a first dimension value for first dimension 354 of 2, and a third entry with a first dimension value for first dimension 354 of 3. Each entry further includes multiple metric values 358, representing a count, a sum, a minimum, and a maximum of metric values 308 for entries matching the value for the first dimension 354.

For the first entry with a first dimension value of 1 for first dimension 354, the corresponding metric values 358 include a count of 6 (since 6 entries in metric time series 300 show a first value for first dimension 304 of 1), a sum of 70 (computed as the sum of metric values 308 for all entries in metric time series 300 with a first dimension 304 of 1), a minimum of 0 (corresponding to the smallest of metric values 308 for all entries in metric time series 300 with a first dimension 304 of 1), and a maximum of 40, corresponding to the largest of metric values 308 for all entries in metric time series 300 with a first dimension 304 of 1). For the second entry with a first dimension value of 2 for first dimension 354, the corresponding metric values 358 include a count of 2 (since 2 entries in metric time series 300 show a first value for first dimension 304 of 2), a sum of 15 (computed as the sum of metric values 308 for all entries in metric time series 300 with a first dimension 304 of 2), a minimum of 0 (corresponding to the smallest of metric values 308 for all entries in metric time series 300 with a first dimension 304 of 2), and a maximum of 15, corresponding to the largest of metric values 308 for all entries in metric time series 300 with a first dimension 304 of 2). Similarly, for the first entry with a first dimension value of 3 for first dimension 354, the corresponding metric values 358 include a count of 3 (since 3 entries in metric time series 300 show a first value for first dimension 304 of 3), a sum of 105 (computed as the sum of metric values 308 for all entries in metric time series 300 with a first dimension 304 of 3), a minimum of 15 (corresponding to the smallest of metric values 308 for all entries in metric time series 300 with a first dimension 304 of 3), and a maximum of 70, corresponding to the largest of metric values 308 for all entries in metric time series 300 with a first dimension 304 of 3). In this way, the aggregated metric time series 350 can represent a reduction in complexity, size, and number of entries, compared to metric time series 300. A benefit of the aggregation according to this scheme is that certain statistical information about the data in metric time series 300 is retained for aggregated metric time series 350. For example, an average of all the metric values 308 is 17.27, a sum of all the metric values 308 is 190, a count of all the metric values 308 is 11, a minimum of all the metric values 308 is 0 and a maximum of all the metric values 308 is 70, while an average of all the metric values 358 is also 17.27, a sum of all the metric values 358 is also 190, a count of all the metric values 358 is also 11, a minimum of all the metric values 358 is also 0 and a maximum of all the metric values 358 is also 70.

FIG. 4A and FIG. 4B provides an example showing aggregation of metric time series data. In this example, FIG. 4A shows metric time series 400 with 3 data points or entries obtained at each of 3 different times 402. First dimension 404 shows two different first dimension value (1 and 2), second dimension 406 shows three different second dimension values (A, B, and C), and various different metric values 408 are shown. In this Example, the metric values 408 represent numbers from a cumulative metric, such as a cumulative counter, where numbers at subsequent times only increase (unless they are reset to zero). An example of a cumulative metric that operates in such a fashion includes a system's uptime.

FIG. 4B shows an example of aggregated metric time series data 450 determined from metric time series 400. For aggregation, data may be aggregated on a per time step basis according to aggregation criteria—in this case the aggregation is across first dimension 404 while second dimension 406 is dropped, and a new set of aggregated metric values 458 are determined—here a count, a sum, a minimum, a maximum, and a delta—here representing a difference of the sum as compared to a previous time step. At time 452 equal to 1, for the first entry with a first dimension value of 1 for first dimension 454, the corresponding metric values 458 include a count of 2 (since 2 entries in metric time series 400 at time of 1 show a first value for first dimension 404 of 1), a sum of 30 (computed as the sum of metric values 408 for all entries in metric time series 400 at time 1 with a first dimension 404 of 1), a minimum of 10 (corresponding to the smallest of metric values 408 for all entries in metric time series 400 at a time of 1 with a first dimension 404 of 1), a maximum of 20, corresponding to the largest of metric values 408 for all entries in metric time series 400 at a time of 1 with a first dimension 404 of 1), and a delta of 30, corresponding to a sum of differences between metric values 408 and zero since time 402 of 1 is the first time.

At time 452 equal to 2, for the first entry with a first dimension value of 1 for first dimension 454, the corresponding metric values 458 include a count of 2 (since 2 entries in metric time series 400 at time of 2 show a first value for first dimension 404 of 1), a sum of 30 (computed as the sum of metric values 408 for all entries in metric time series 400 at time 2 with a first dimension 404 of 1), a minimum of 10 (corresponding to the smallest of metric values 408 for all entries in metric time series 400 at a time of 2 with a first dimension 404 of 1), a maximum of 20, corresponding to the largest of metric values 408 for all entries in metric time series 400 at a time of 2 with a first dimension 404 of 1), and a delta of 20, corresponding to a sum of differences between the metric values 408 at time 402 of 2 and the previous time 402 of 1. Here, for the first entry at time 402 of 2 with first dimension 404 of 1, the metric value 408 of 20 compares with the previous metric value 408 of 10 at time 402 of 1 (for a difference of 10), and for the second entry at time 402 of 2 with first dimension 404 of 1, the metric value 408 of 10 compares with the previous metric value 408 of 20 at time 402 of 1 (for a difference of 10 since metric values must increment unless a reset occurs—here a value of 10 compared to a previous value of 20 indicates a reset occurs and there for the difference value is 10), for a total delta of 20. In some examples, a metric value including a "delta" may be calculated only for cumulative counters and not for other types of counters (e.g., distributed counters).

At time 452 equal to 3, for the first entry with a first dimension value of 1 for first dimension 454, the corresponding metric values 458 include a count of 2 (since 2 entries in metric time series 400 at time of 3 show a first value for first dimension 404 of 1), a sum of 50 (computed as the sum of metric values 408 for all entries in metric time series 400 at time 3 with a first dimension 404 of 1), a minimum of 20 (corresponding to the smallest of metric values 408 for all entries in metric time series 400 at a time of 3 with a first dimension 404 of 1), a maximum of 30, corresponding to the largest of metric values 408 for all entries in metric time series 400 at a time of 3 with a first dimension 404 of 1), and a delta of 20, corresponding to a sum of difference between metric values 408 at time 402 of 3 corresponding metric values 408 at time 402 of 2. FIG. 4B also shows entries for a value of first dimension 454 of 2, with metric values determined similarly.

Figure 5:
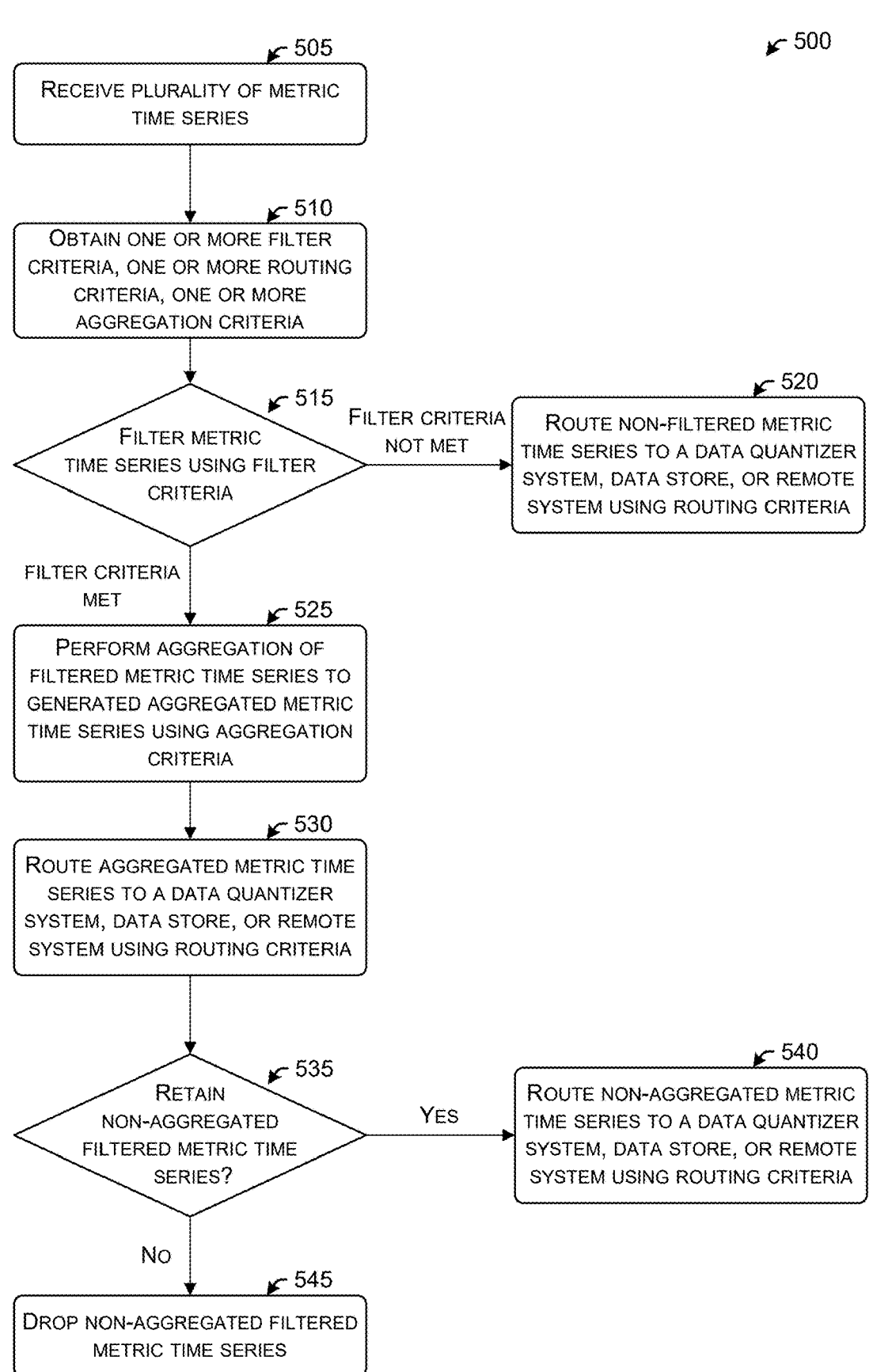
FIG. 5 provides an overview of an example process for aggregating metric time series data.

Turning next to FIG. 5, a flow chart providing an overview of an example method 500 is shown. Method 500 may correspond to a process performed by an ingestion system, such as ingestion system 110 or ingestion system 220. Method 500 begins at 505, where a plurality of metric times series are received. As described above, the metric time series may include various metadata, various dimensions, and various metric values. For example, each metric time series may comprise a plurality of data points, with each data point including a timestamp, one or more dimensions and one or more values.

At 510, one or more filter criteria are obtained, one or more routing criteria are obtained, and/or one or more aggregation criteria are obtained. The filter criteria may identify one or more dimension values or metadata values to flag or identify one or more metric time series. In some examples, the filter criteria may be obtained from a remote system or may be received as input, such as user input. The routing criteria may identify how filtered and/or non-filtered metric time series are to be routed, such as to one or more of a routing system, a data quantizer system, a data store, or a remote system. Optionally, the routing criteria may identify particular metric time series that are to be dropped (e.g., one or more metric time series that are used to generate an aggregated metric time series).

At 515, method 500 includes filtering the metric time series using the filter criteria. This may include matching one or more filter criteria to dimension values or metadata values in the metric time series. In some cases, when the filter criteria are not met, method 500 advances to 520, where non-filtered metric time series are routed to a data quantizer system, a data store, or a remote system, such as according to one or more routing criteria.

In some cases, when one or more filter criteria is met, method 500 advances to 525, where the filtered metric time series is aggregated to generate an aggregated metric time series according to one or more aggregation criteria, which may identify an aggregation technique or algorithm, identify one or more dimensions or metric values to drop, or the like. In examples, aggregation of the metric time series can include various processes to combine or consolidate multiple data points of the filtered metric time series into fewer aggregated data points.

Although method 500, as illustrated, advances to 520 when the filter criteria is not met and to 525 when the filter criteria is met, other example methods can operate opposite to this configuration with an alternative filtering technique, such as where method 500 advances to 520 when the filter criteria is met and to 525 when the filter criteria is not met. It will be appreciated that filtering can be used to either identify particular metric time series for performing aggregation while all other metric time series are routed to a data quantizer system, data store, or remote system, or to identify particular metric time series for routing to a data quantizer system, data store, or remote system while all other metric time series are subjected aggregation.

At 530, method 500 includes routing the aggregated metric time series to a data quantizer system, data store, or remote system, similar to the routing at 520, according to one or more routing criteria. In some cases, the routing at 520 and 530 are performed similarly or identically, such that the receiving data quantizer system, data store, or remote system does not distinguish between the non-filtered metric time series and the aggregated metric time series.

At 535, method 500 includes determining whether to retain the non-aggregated filtered metric time series (e.g., the original metric time series used to generate the aggregated metric time series). Optionally, this may be performed using one or more routing criteria, which may indicate where to route the non-aggregated filtered metric time series or whether to drop the non-aggregated filtered metric time series. If the non-aggregated filtered metric time series is to be retained, method 500 advances to 540, where the non-aggregated filtered metric time series is routed to a data quantizer system, a data store, or a remote system according to one or more routing criteria. If the non-aggregated filtered metric time series is not to be retained, method 500 advances to 545, where the non-aggregated filtered metric time series is dropped.

Figure 6:
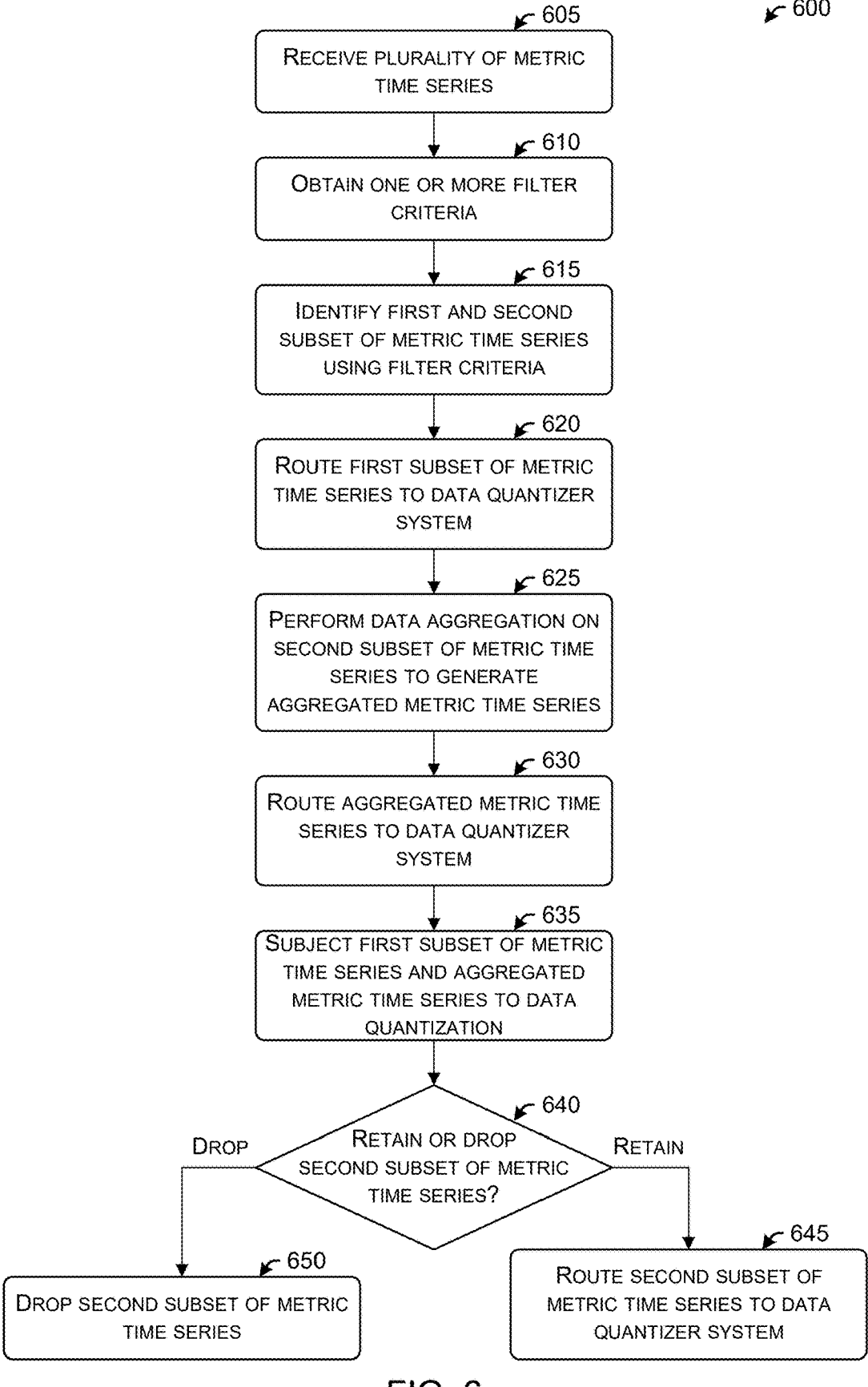
FIG. 6 provides an overview of an example process for aggregating metric time series data.

Turning next to FIG. 6, a flow chart providing an overview of an example method 600 is shown. Method 600 may correspond to a process performed by a data quantizer system, such as a data quantizer system including an ingestion system. Method 600 begins at 605, where a plurality of metric times series are received. As described above, the metric time series may include various metadata, various dimensions, and various metric values. For example, each metric time series may comprise a plurality of data points, with each data point including a timestamp, one or more dimensions and one or more values.

At 610, one or more filter criteria are obtained. The filter criteria may identify one or more dimension values or metadata values to flag or identify one or more metric time series. In some examples, the filter criteria may be obtained from a remote system or may be received as input, such as user input.

At 615, method 600 includes identifying a first subset and a second subset of the metric time series using the filter criteria. This may include matching one or more filter criteria to dimension values or metadata values in the metric time series.

At 620, the first subset of metric time series is routed to a data quantizer system. At 625, the second subset of metric time series is aggregated to generate an aggregated metric time series. In examples, aggregation of the metric time series can include various processes to combine or consolidate multiple data points of the filtered metric time series into fewer aggregated data points according to one or more aggregation criteria. At 630, the aggregated metric time series is routed to a data quantizer system.

Although method 600, as illustrated, shows routing of the first subset of metric time series followed by aggregation of the second subset of metric time series, the order of these operations as shown in FIG. 6 is not limiting. In some examples, the aggregation of the second subset of metric time series can be performed prior to routing of the first subset of metric time series. In practice, the first and second time series may be subjected to routing or data aggregation, as the case may be, as they are received by an ingestion system, and such processes may optionally occur simultaneously.

At 635, the first subset of metric time series and the aggregated metric time series are subjected to data quantization, such as by a data quantizer system. Data quantization may include one or more processes including, but not limited to, processing or transforming the data values in the first subset of metric time series and the aggregated metric time series to roll-up data points including quantized values associated with one or more regular time intervals. The data quantization may make other transformations or aggregations of the first subset of metric time series and the aggregated metric time series and/or any roll-up data generated therefrom, such as for purposes of generating analytics data, as generally described above with reference to FIG. 1 and data quantizer system 125.

At 640, method 600 includes determining whether to retain the second subset of metric time series (e.g., the original metric time series used to generate the aggregated metric time series). If the second subset of metric time series is to be retained, method 600 advances to 645, where the second subset metric time series is routed to the data quantizer system, where it may be optionally subjected to data quantization. If the second subset of metric time series is not to be retained, method 600 advances to 650, where the second subset of metric time series is dropped. 4.0. TER-MINOLOGY Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. § 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
receiving a plurality of metric time series at a computing system;

identifying, using one or more filter criteria, a particular metric time series of the plurality of metric time series for aggregation, the particular metric time series including a plurality of dimensions;

performing, using one or more aggregation criteria, aggregation of data points of the particular metric time series to generate an aggregated metric time series, wherein the aggregated metric time series includes fewer dimensions than the plurality of dimensions included in the particular metric time series;

routing the particular metric time series to a data store;

routing the aggregated metric time series to a data quantizer system;

generating, by the data quantizer system, roll-up data points based on the aggregated metric time series, the roll-up data points including quantized values associated with a plurality of time intervals, wherein the aggregated metric time series includes, for each time interval of the plurality of time intervals and for each value of a plurality of values of a particular dimension included in the aggregated metric time series, an aggregated data point comprising a plurality of data values, and wherein the plurality of data values includes a first data value that is computed as a sum of differences between (i) metric values of data points included in the particular metric time series and associated with a value of the particular dimension and belonging to a time interval and (ii) metric values of data points included in the particular metric time series and associated with the value of the particular dimension and belonging to an immediately previous time interval; and processing, by the computing system, the roll-up data points generated over the plurality of time intervals to determine an overall usage of a plurality of processor cores distributed in one or more datacenters, wherein each of the plurality of metric time series includes information related to processor usage in a data center of the one or more datacenters.

2. The computer-implemented method of claim 1, further comprising routing other metric time series from the plurality of metric time series that are not identified for aggregation to one or more of a data quantizer system, a data store, or a remote system.

3. The computer-implemented method of claim 1, wherein each metric time series in the plurality of metric time series includes one or more dimensions and/or one or more metadata values.

4. The computer-implemented method of claim 1, wherein each metric time series in the plurality of metric time series comprises a plurality of data points, each data point including a timestamp, one or more dimensions, and one or more values.

5. The computer-implemented method of claim 1, wherein the aggregated metric time series comprises a plurality of data points, each data point including a timestamp, one or more dimensions, and a plurality of values.

6. The computer-implemented method of claim 1, wherein the one or more filter criteria identify the particular dimension or metadata value and wherein identifying the particular metric time series comprises matching the particular dimension or metadata value to the particular metric time series.

7. The computer-implemented method of claim 1, further comprising obtaining the one or more filter criteria from a remote system or receiving input corresponding to the one or more filter criteria.

8. The computer-implemented method of claim 1, wherein the aggregation criteria specifies a number of data points to consolidate for each aggregated data point.

9. The computer-implemented method of claim 1, wherein the aggregation criteria specifies one or more dimensions included in the particular metric time series to retain for each aggregated data point or to drop for each aggregated data point.

10. The computer-implemented method of claim 1, wherein the aggregation criteria specifies a computation algorithm for aggregating values for each aggregated data point.

11. The computer-implemented method of claim 1, wherein each of multiple data points of the particular metric time series includes a corresponding value and wherein aggregating comprises creating aggregated data points using a plurality of the corresponding values from different data points of the multiple data points.

12. The computer-implemented method of claim 1, wherein data points of the particular metric time series include first dimension values for a first dimension, second dimension values for a second dimension, and a metric value, wherein aggregation includes generating, from a plurality of data points of the particular metric time series, an aggregated data point, wherein the aggregated data point includes a plurality of entries, each entry corresponding to a different first dimension value for the first dimension.

13. The computer-implemented method of claim 12, wherein the plurality of data values further includes:

a count of a number of data points including a particular dimension value, a sum of metric values from data points including the particular dimension value, a maximum of metric values from data points including the particular dimension value, a minimum of metric values from data points including the particular dimension value, and an average of metric values from data points including the particular dimension value.

14. The computer-implemented method of claim 1, further comprising obtaining the one or more aggregation criteria from a remote system or receiving input corresponding to the one or more aggregation criteria.

15. The computer-implemented method of claim 1, further comprising:

determining, based on one or more routing criteria, whether the particular metric time series is to be communicated to a remote system.

16. The computer-implemented method of claim 15, wherein the one or more routing criteria indicates that the aggregated metric time series is to be communicated to a remote system.

17. The computer-implemented method of claim 15, further comprising obtaining the one or more routing criteria from a remote system or receiving input corresponding to the one or more routing criteria.

18. A computing device, comprising:

a processor; and a non-transitory computer-readable medium having stored thereon instructions that, when executed by the processor, cause the processor to perform operations comprising:

receiving a plurality of metric time series at a computing system;

identifying, using one or more filter criteria, a particular metric time series of the plurality of metric time series for aggregation, the particular metric time series including a plurality of dimensions;

performing, using one or more aggregation criteria, aggregation of data points of the particular metric time series to generate an aggregated metric time series, wherein the aggregated metric time series includes fewer dimensions than the plurality of dimensions included in the particular metric time series;

routing the particular metric time series to a data store;

routing the aggregated metric time series to a data quantizer system;

generating, by the data quantizer system, roll-up data points based on the aggregated metric time series, the roll-up data points including quantized values associated with a plurality of time intervals, wherein the aggregated metric time series includes, for each time interval of the plurality of time intervals and for each value of a plurality of values of a particular dimension included in the aggregated metric time series, an aggregated data point comprising a plurality of data values, and wherein the plurality of data values includes a first data value that is computed as a sum of differences between (i) metric values of data points included in the particular metric time series and associated with a value of the particular dimension and belonging to a time interval and (ii) metric values of data points included in the particular metric time series and associated with the value of the particular dimension and belonging to an immediately previous time interval; and processing the roll-up data points generated over the plurality of time intervals to determine an overall usage of a plurality of processor cores distributed in one or more datacenters, wherein each of the plurality of metric time series includes information related to processor usage in a data center of the one or more datacenters.

19. A non-transitory computer-readable medium comprising instructions that, when executed by one or more processors, cause the one or more processors to perform operations comprising:

receiving a plurality of metric time series at a computing system;

identifying, using one or more filter criteria, a particular metric time series of the plurality of metric time series for aggregation, the particular metric time series including a plurality of dimensions;

performing, using one or more aggregation criteria, aggregation of data points of the particular metric time series to generate an aggregated metric time series, wherein the aggregated metric time series includes fewer dimensions than the plurality of dimensions included in the particular metric time series;

routing the particular metric time series to a data store;

routing the aggregated metric time series to a data quantizer system; and generating, by the data quantizer system, roll-up data points based on the aggregated metric time series, the roll-up data points including quantized values associated with a plurality of time intervals, wherein the aggregated metric time series includes, for each time interval of the plurality of time intervals and for each value of a plurality of values of a particular dimension included in the aggregated metric time series, an aggregated data point comprising a plurality of data values, and wherein the plurality of data values includes a first data value that is computed as a sum of differences between (i) metric values of data points included in the particular metric time series and associated with a value of the particular dimension and belonging to a time interval and (ii) metric values of data points included in the particular metric time series and associated with the value of the particular dimension and belonging to an 5 immediately previous time interval; and processing, by the computing system, the roll-up data points generated over the plurality of time intervals to determine an overall usage of a plurality of processor cores distributed in one or more datacenters, wherein 10 each of the plurality of metric time series includes information related to processor usage in a data center of the one or more datacenters.

\*  \*  \*  \*  \*